United States Patent

Hiramatsu

[11] Patent Number: 6,051,515
[45] Date of Patent: Apr. 18, 2000

[54] DIELECTRIC CERAMICS

[75] Inventor: Nobuki Hiramatsu, Kokubu, Japan

[73] Assignee: Kyocera Corporation, Kyoto, Japan

[21] Appl. No.: 09/088,098

[22] Filed: Jun. 1, 1998

[30] Foreign Application Priority Data

May 30, 1997 [JP] Japan .................................. 9-141756

[51] Int. Cl.⁷ .............................................. C04B 35/495
[52] U.S. Cl. .......................................................... 501/135
[58] Field of Search ............................................. 501/135

[56] References Cited

U.S. PATENT DOCUMENTS

| | | | |
|---|---|---|---|
| 5,268,341 | 12/1993 | Koyasu et al. | 501/135 |
| 5,432,135 | 7/1995 | Hirahara et al. | 501/135 |
| 5,459,115 | 10/1995 | Kagata et al. | 501/135 |
| 5,504,044 | 4/1996 | Okawa et al. | 501/135 |

FOREIGN PATENT DOCUMENTS 9268058  10/1997  Japan .

*Primary Examiner*—Karl Group
*Attorney, Agent, or Firm*—Loeb & Loeb, LLP

[57] ABSTRACT

In the dielectric ceramic of this invention, a perovskite-type crystal phase is precipitated as a main crystal phase and a complex oxide crystal phase other than the perovskite-type crystal phase is precipitated as a sub-crystal phase, wherein the above perovskite-type crystal phase contains Mg, W, an iron family metal elements and/or Zn and Ba and/or Sr as metal elements, and the complex oxide crystal phase contains W, and Ba and/or Sr as metal elements and the main crystal phase and the sub-crystal phase have a peak intensity ratio by X-ray diffraction of formula (1):

$$I_{112}/I_{211} < 0.10 \qquad (1)$$

wherein $I_{112}$ represents a peak intensity of the (112) plane in a tetra-gonal system in the above sub-crystal phase, and $I_{211}$ represents a peak intensity of the (211) plane in a rhombohedral system in the main crystal phase.
This dielectric ceramic has a Q value of as high as at least 10000 at 10 GHz, and is used effectively in a utility of dielectric substrates of various instruments or machines to which high frequency signals are applied.

5 Claims, 1 Drawing Sheet

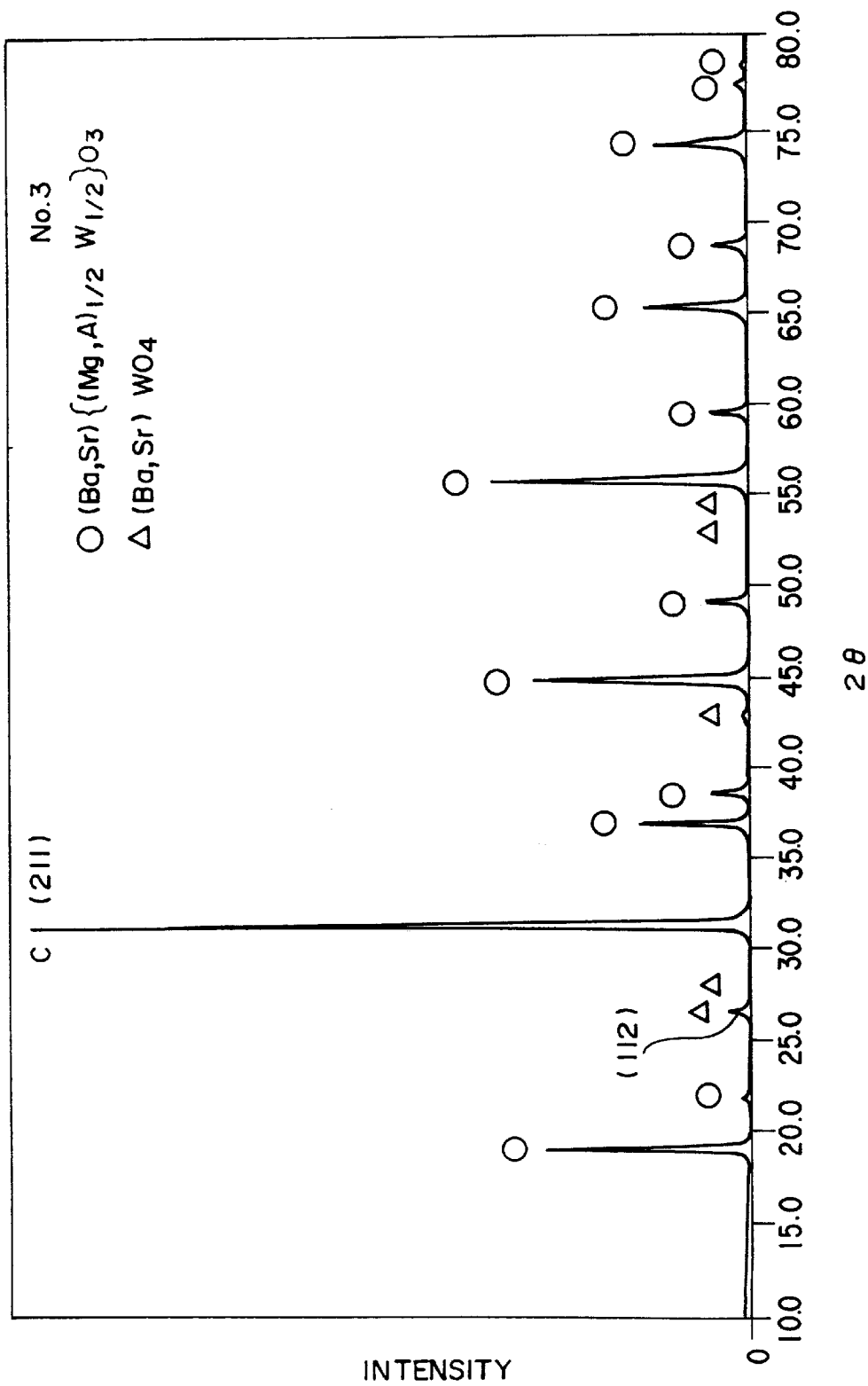

DIELECTRIC CERAMICS

BACKGROUND OF THE INVENTION

1. Field of the Invention

This invention relates to a dielectric ceramic, especially a dielectric ceramic suitable as an electronic component part to which high frequency signals are applied such as a dielectric resonator, a filter or a capacitor, an MIC dielectric substrate, or a wave guide for transmitting millimeter waves.

2. Description of the Prior Art

Dielectric ceramics have been widely utilized as a dielectric resonator and an MIC dielectric substrate to which signals in a high frequency region such as microwaves or millimeter waves are applied. Furthermore, dielectric ceramics have been recently utilized in waveguides for transmitting millimeter waves.

As the dielectric ceramics used in these applications, $ZrO_2$—$SnO_2$—$TiO_2$ type, $BaO$—$TiO_2$ type and $(Ba, Sr)(Zr, Ti)O_3$ type have been known. As a result of various modifications these dielectric ceramics have a dielectric constant ($\epsilon r$) of 20 to 40, a quality factor (may sometimes be referred to as Q value) of 1000 to 3000, and a temperature coefficient of the resonance frequency ($\tau f$) of about 0 ppm/° C.

In recent years, the frequency bands used tend to become higher. Accordingly, the dielectric ceramics used in various instruments or machines mentioned above are required to have excellent dielectric characteristics, especially high Qf values in a high frequency region. The Qf values means (Q value)×(measured frequency f). Generaly, since the Q value of a dielectric ceramics is different depending upon frequency measured, Q values are compared by Qf values. However, the known dielectric ceramics have a low Q value in a high frequency region, for example such dielectric ceramics have a Q value of not larger than 1500 at a frequency of 10 GHz (Qf value of not larger than 15000) which does not reach a practical level.

SUMMARY OF THE INVENTION

It is therefore an object of this invention to provide a dielectric ceramic having a high Q value in a high frequency region, especially a dielectric ceramic having a Q value of at least 10000 at 10 GHz.

According to this invention, there is provided a dielectric ceramic comprising a perovskite-type crystal phase being precipitated as a main crystal phase and a complex oxide crystal phase other than the peroviskite-type crystal phase being precipitated as a sub-crystal phase, wherein the peroviskite-type crystal phase contains Mg, W, an iron family metal elements and/or Zn, and Ba and/or Sr as metal elements, the complex oxide crystal phase contains W, Ba and/or Sr as metal elements, and the main crystal phase and the sub-crystal phase have a peak intensity ratio by X-ray diffraction of the formula (1):

$$I_{112}/I_{211} < 0.10 \tag{1}$$

wherein $I_{112}$ represents the peak intensity of the (112) plane in a tetragonal system of the sub-crystal phase, and $I_{211}$ represents the peak intensity of the (211) plane in a rhombohedral system of the main crystal phase.

In the dielectric ceramic of the invention, the metal elements constituting the perovskite-type crystal phase and the complex oxide crystal phase are such that when the mole ratio of the metal elements is shown in the following composition formula (2):

$$x\{(1-a)BaO \cdot aSrO\} \cdot y\{(1-b)MgO \cdot bRO\} \cdot zWO_3 \tag{2}$$

wherein R represents an iron family metal elements and/or Zn, and x, y and z are numbers satisfying $x+y+z=1$, a, b, x, y and z preferably satisfy the following conditions:

$0 \leq a \leq 0.4$
$0.01 \leq b \leq 0.4$
$0.48 \leq x \leq 0.51$
$0.23 \leq y \leq 0.27$
$0.24 \leq z \leq 0.26$ Furthermore, the crystal particles in the main crystal phase and the sub-crystal phase should preferably have an average particle diameter of 3 to 20 μm.

BRIEF DESCRIPTION OF THE DRAWING

FIG. 1 shows an X-ray diffraction chart of the dielectric ceramic (sample No. 3) of this invention produced in Example.

DETAILED DESCRIPTION OF THE INVENTION

This invention is based on a novel finding that in a dielectric ceramic in which the peroviskite-type crystal phase is precipitated as a main crystal phase, a complex oxide crystal phase other than the perovskite-type crystal phase which is inevitably precipiated becomes a cause of a decreasing of a Q value. By suppressing the precipitation of such a complex oxide phase having a low Q value, it has been successful to obtain a dielectric ceramic having a high Q value.

In the present invention, the perovskite-type crystal phase constituting a main crystal phase should have Mg, W. an iron family metal elements and/or Zn, and Ba and/or Sr. This perovskite-type crystal phase is expressed by, for example, the following formula (3):

$$(Ba_{1-c}Sr_c)\{(Mg_{1-d}R_d)_{1/2}W_{1/2}\}O_3 \tag{3}$$

wherein R represents an iron family metal elements and/or Zn, and c and d represents $0 \leq c \leq 1$, and $0 < d < 1$.
As is understood from the general formula (3), $ABO_3$-type perovskite-type crystal phase precipitated as a main crystal phase in the dielectric ceramic of this invention has such a structure in which in the A site, Ba and/or Sr enters, and in the B site, Mg, R and W enter, and especially in the B site, a part of Mg is replaced by R (iron family metal elements and/or Zn). Such a perovskite-type crystal has a high Q value in a high frequency region, and when such a perovskite-type crystal is precipitated as a main crystal phase, it is possible to obtain a dielectric ceramic having a high Q value. The iron family metal elements includes Fe, Ni and Co, but in the present invention, Ni and Co are preferred.

When a perovskite-type crystal expressed by the general formula (3) is precipitated as a main crystal phase, a complex oxide in a crystal phase other than the perovskite crystal is precipitated inevitably as a sub-crystal phase. This complex oxide crystal phase contains W, Ba and/or Sr, and for example, the complex oxide is represented by the following formula (4):

$$(Ba_{1-e}Sr_e)WO_4 \tag{4}$$

wherein e is a number satisfying $0 \leq e \leq 1$.
Such a crystal phase of a complex oxide has a characteristic that it has a low Q value. When such a crystal phase is precipitated as a sub-crystal phase, the Q value of the dielectric ceramic is lowered.

In the dielectric ceramic of this invention, the precipitation amount of the complex oxide crystal phase is adjusted to a certain value or below based on the perovskite-type crystal phase constituting the main crystal phase. By this adjustment, the decrease of the Q value by the precipitation of the sub-crystal phase is effectively prevented, and a high Q value is shown even in a high frequency region. In the present invention, when the peak intensity of the (211) plane in a rhombohedral system of a main crystal phase composed of a perovskite-type crystal phase in X-ray diffraction is $I_{211}$, and the peak intensity of the (112) plane in a tetragonal system of a sub-crystal phase composed of the complex oxide crystal phase in X-ray diffraction is $I_{112}$ the ratio of these peak intensities satisfies the following formula (1):

$$I_{112}/I_{211} < 0.10 \quad (1)$$

This peak intensity ratio is especially in a range of 0.01 to 0.05. As shown in the experimental results of Examples to be mentioned later, the dielectric ceramics of the invention which satisfy the peak ratio of the formula (1) have a Q value of at least 10000 at 10 GHz, especially as high as at least 11100, but the dielectric ceramic which does not satisfy the peak intensity ratio of formula (1) has a Q value lower than 10000 measured at the same frequency. From such experimental results, it will be understood that the Q value can be increased by suppressing the precipitation of the complex oxide crystal phase.

The peak in the plane (211) in the rhombohedral system of the main crystal phase forms around $2\theta=31°$ in an X-ray diffraction pattern when as an X-ray source, a Cu–Kα ray is used, and the peak in the (112) plane in the tetragonal system of the sub-crystal phase occurs in the neighborhood of $2\theta=26°$.

The peak intensity ratio can be adjusted by controlling the sintering conditions such as the sintering temperature and the sintering time according to the composition of the starting raw material powders. The complex oxide crystal phase to be precipitated as a sub-crystal phase is not limited to that shown by the general formula (4). For example, when a crystal phase such as $Ba_2WO_5$ is present in a slight amount, so long as the above conditions of peak intensities are satisfied, there is no problem in the characteristics of the dielectric ceramics. A slight amount of an amorphous phase may exist in the grain boundary of a crystal phase.

When the molar ratio of metal elements constituting the main crystal phase and the sub-crystal phase is shown as in the composition formula (2), $$x\{(1-a)BaO \cdot aSrO\} \cdot y\{(1-b)MgO \cdot bRO\} \cdot zWO_3 \quad (2)$$

wherein R represents an iron metal elements and/or Zn, and $x+y+z=1$, it is preferred that a, b, x, y and z should satisfy the following relations, namely a should be $0 \leq a \leq 0.4$, especially $a > 0$,
b should be $0.01 \leq b \leq 0.4$, especially $0.01 \leq b \leq 0.3$,
x shoud be $0.48 \leq x \leq 0.51$, especially $0.49 \leq x \leq 0.50$,
y should be $0.23 \leq y \leq 0.27$, especially $0.24 \leq y \leq 0.26$, and
z should be $0.24 \leq z \leq 0.26$, especially $0.25 \leq z \leq 0.26$.

By prescribing the amounts of the metal elements in the dielectric ceramic so that they should satisfy the above conditions, it is possible to obtain the dielectric ceramic having the above-mentioned peak intensity ratio a high Q value and a low dielectric constant by sintering at a low temperature. Furthermore, there is an advantage that the temperature coefficient of the resonance frequency (τf) can be adjusted freely within a certain region.

The a in the formula (2), for example, corresponds to the quantity ratio of Ba and Sr which occupy the A site in the perovskite-type crystal phase. By prescribing the value a within the above range, the temperature coefficient of the resonance frequency (τf) can be adjusted within a range of about –30 to +30 ppm/° C. In this case, as the value a becomes great, the temperature coefficient of resonance frequency (τf) becomes greater from a minus side to a plus side. When a=0, Ba element is only existed in the A site in the perovskite-type crystal phase, therefore the temperature coefficient of the resonance frequency (τf) is shifted to a minus side, and its control cannot be carried out. In the present invention, therefore, from the point that τf is adjusted to a value near zero ppm/° C., a should preferably become a>0. When the value a is larger than the above range, the amount of Sr ocupated in the A site becomes large, and therefore, the temperature coefficient of the resonance frequency (τf) is dominated by the Sr component, with the result that the temperature coefficient (τf) is shifted to a plus side and becomes higher than +30 ppm/° C. and its control becomes difficult.

The value b in the formula (2) corresponds to the quantity ratio of Mg and the iron family metal elements or Zn, and when b is smaller than the above range, the sintering temperature becomes high and it is difficult to obtain an dense ceramics. Furthermore, when b becomes larger than the above range, it is difficult to obtain a dielectric ceramics having a high Q value.

In the formula (2), x, y and z show the quantity ratio of the metal elements which can enter into an A site and a B site of the perovskite-type crystal phase. By prescribing the ratio of these elements within the above range, a sufficient amount of the perovskite-type crystal phase is precipitated as a main crystal phase, and by sintering at a low temperature, it becomes possible to obtain a dielectric ceramic which is elaborate and has a high Q value. For example, when x and y are outside the range mentioned above, or z is larger than the value mentioned above, the Q value of the dielectric ceramic will be lowered. Furthermore, when y is larger than the above range or z is smaller than the above range, poor sintering occurs, and by sintering at a low temperature, it is difficult to obtain an elaborate ceramic.

The dielectric ceramics of this invention have an average crystal particle diameter of 3 to 20 μm, especially preferably 5 to 10 μm. When the average crystal particle diameter is within this range, the Q values of the dielectric ceramics become highest. When the average crystal particle diameter is outside the above range, the Q values tend to become low. The average crystal particle diameter is an average particle diameter of all crystal particles contained in the dielectric ceramics which include not only the perovskite-type crystals constituting the main crystal phase but also complex oxide crystals constituting the sub-crystal phase. The average crystal particle diameter can be easily adjusted by controlling the sintering temperature or the sintering time.

Production of the Dielectric Ceramics:

In producing the dielectric ceramics of this invention, powders of oxides of various metal elements, various metal salts capable of forming oxides by sintering, for example, powders of carbonates and nitrates may be used as supply sources of various metal elements. The amounts of these starting powders are prescribed in quantity ratios which satisfy the a, b, x, y and z in the formula (2).

Specifically, powders of oxides becoming supply sources for Ba, Sr, Mg and W and powders of oxides becoming supply sources for the iron family metal elements or zinc (for example, $Co_3O_4$, NiO and ZnO) are mixed with a suitable solvent, the solvent is removed from the mixture and the mixture is dried, and the final mixture is calcined at 900 to 1300° C. for a period of 1 to 4 hours under an in the air.

Then, a suitable organic binder was added and mixed and the mixture was molded into a predetermined shape by a known method such as a press molding or a doctor blade method, and the molded product was sintered at a temperature of 1300° C. to 1650° C., especially at 1500 to 1600° C. for 1 to 24 hours in an oxidizable atmosphere such as air to give an intended dielectric ceramic. Especially, by sintering the molded mixture at 1500 to 1600° C., the average crystal particle diameter can be adjusted to 3 to 20 μm especially 5 to 10 μm.

When calcination was not performed in this case, the ratio of synthesis of the peroviskite-type crystal phase of the main crystal phase becomes low, and the Q value is decreased.

In order to prescribe the peak intensity ratio by X-ray diffraction within a predetermined range, the sintering conditions may be controlled according to the composition of the above-mentioned metal elements, namely according to a, b, x, y and z in the formula (2), and the average crystal particle diameter may be properly adjusted according to the sintering conditions. For example, as the sintering temperature is higher, the peak intensity ratio becomes larger, and the average crystal particle diameter tends to become higher. When the sintering time becomes long, the same tendency occurs. By prescribing the sintering temperature or the sintering time within suitable values according to values a, b, x, y and z, the peak intensity ratio of formula (1) or the average crystal particle diameter can be adjusted to desired values.

Since in the above-mentioned process for production, inevitable impurities such as Cl, Ca and Zr may exist in powders which may be supply sources for metal elements, the dielectric ceramics may have these impurities included therein. However, if these impurities are included in an amount of not larger than 0.1% by weight calculated as oxides, they do not adversely affect the characteristics of the dielectric ceramics. To reduce variations of characteristics among the resulting dielectric ceramics, Mn may be mixed in an amount of below 0.5 part by weight caclculated as MnO per 100 parts by weight of a composition composed of the metal element supply source powders. Furthermore, to increase sinterability, it is possible to include B in an amount of 0.005 to 0.2 part by weight calculated as $B_2O_3$, or P, Si, an alkali metal in an amount of 0.005 to 1 part by weight calculated as P, $SiO_2$ and carbonate, per 100 parts by weight of the composition.

The so obtained dielectric ceramics have a high Q value, for example, a Q value of at least 10000, especially at least 11100, at 10 GHz. In addition, the temperature coefficient of the resonance frequency (τf) can be controlled over a relatively wide range. Especially, since the temperature coefficient (τf) can be adjusted to near zero ppm/° C., the dielectric ceramics of this invention can be extremely useful in such utilities such as electronic component parts to which high frequency signals are applied such as a dielectric resonator, a filter or a capacitor, MIC dielectric substrates, or waveguides for transmitting millimeter waves.

The present invention will be explained as follows.

[Examples]

As starting materials, $BaCO_3$, $SrCO_3$, $MgCO_3$, NiO, $Co_3O_4$, ZnO and $WO_3$ having a purity of at least 99% were used in the form of a powder, and weighed in amounts as shown in Table 1. These starting materials were put into a ball mill lined with rubber together with isopropyl alcohol (IPA), and wet-mixed for 8 hours using a $ZrO_2$ ball. The solvent was removed from the mixture, and the resulting mixture was dried. The resulting product was calcined at 1200° C. for 2 hours in the air. The calcined product and IPA were put into a ball mill using a $ZrO_2$ ball and wet-pulverized for 8 hours.

The pulverized product was thereafter dried, and an organic binder was added. The mixture was granulated through a 50-mesh screen. The resulting powder was molded at the pressure of 3000 kg/cm² into a cylinder having a diameter of 10 mm and a thickness of 5 mm. This cylindrical molded product was sintered in the air at a temperature shown in Table 1 to obtain a sintered ceramic. The ceramic was polished to form samples having a diameter of 8 mm and a thickness of 4 to 5 mm.

The dielectric constants (εr) and the Q values of the samples at a frequency of about 10 to 11 GHz were measured by a dielectric resonator method. The Q values of the samples were calculated as Q values at 10 GHz by supposing that the general formula Qf=constant is established. The average crystal particle diameter was measured by an intercepting method from an Scanning Electron Microscopy (SEM) photograph after polishing, and hot-etching the sectional surface of a ceramics. When X-ray diffraction (CuKα) was performed, the peak of the (211) plane in a rhombohedral system appears in the vicinity of 2θ=31° of a perovskite-type crysta, these expressed by $(Ba_{1-c}Sr_c)\{(Mg_{1-d}R_d)_{1/2}W_{1/2}\}O_3$ ($0 \leq c \leq 1$, $0 \leq d \leq 1$, and R is at least one member selected from iron family metal elements and Zn). The peak in the (112) plane in a tetragonal system of a crystal phase expressed by the general formula $(Ba_{1-e}Sr_e)WO_4$ ($0 \leq e \leq 1$) appeared in the vicinity of 2θ=26°. From this, $I_{112}/I_{211}$ was sought as the peak intensity ratio. The results are shown in Table 2.

The temperature coefficient of the resonance frequency (τf) was calculated from TEO11 mode resonant frequency at 25° C. and 85° C. based on the following formula.

$$\tau f = [(f_{85} - f_{25})/f_{25}]/60 \times 10^6 [ppm/° C.]$$

wherein $f_{85}$ is a resonant frequency at 85° C., and $f_{25}$ is a resonant frequency at 25° C.

TABLE 1

| Sample No. | x{(1 − a)BaO · aSrO} · y{(1 − b)MgO · bRO} · zWO₃ | | | | | | Sintering temperature (° C.) |
|---|---|---|---|---|---|---|---|
| | x | a | y | b | R | z | |
| 1 | 0.50 | 0 | 0.25 | 0.10 | Co | 0.25 | 1500 |
| 2 | 0.50 | 0 | 0.25 | 0.30 | Zn | 0.25 | 1500 |
| 3 | 0.50 | 0 | 0.25 | 0.05 | Ni | 0.25 | 1500 |
| 4 | 0.50 | 0.10 | 0.25 | 0.20 | Zn | 0.25 | 1500 |
| 5 | 0.50 | 0.10 | 0.25 | 0.40 | Ni | 0.25 | 1500 |
| 6 | 0.50 | 0.10 | 0.25 | 0.30 | Co | 0.25 | 1500 |
| 7 | 0.50 | 0.20 | 0.25 | 0.05 | Zn | 0.25 | i5OO |
| 8 | 0.50 | 0.20 | 0.25 | 0.20 | Ni | 0.25 | 1500 |
| 9 | 0.50 | 0.20 | 0.25 | 0.25 | Co | 0.25 | 1500 |
| 10 | 0.50 | 0.40 | 0.25 | 0.15 | Co | 0.25 | 1500 |
| 11 | 0.50 | 0.40 | 0.25 | 0.35 | Zn | 0.25 | 1500 |
| 12 | 0.50 | 0.40 | 0.25 | 0.10 | Ni | 0.25 | 1500 |
| 13 | 0.50 | 0.10 | 0.25 | 0.01 | Co | 0.25 | 1500 |
| 14 | 0.50 | 0.10 | 0.25 | 0.01 | Ni | 0.25 | 1500 |
| 15 | 0.50 | 0.10 | 0.25 | 0.01 | Zn | 0.25 | 1500 |
| 16 | 0.51 | 0.20 | 0.23 | 0.20 | Zn | 0.26 | 1500 |
| 17 | 0.51 | 0.30 | 0.23 | 0.30 | Co | 0.26 | 1500 |
| 18 | 0.51 | 0.40 | 0.23 | 0.40 | Ni | 0.26 | 1500 |
| 19 | 0.48 | 0.10 | 0.27 | 0.40 | Co | 0.25 | 1500 |
| 20 | 0.48 | 0.20 | 0.27 | 0.40 | Ni | 0.25 | 1500 |
| 21 | 0.48 | 0.20 | 0.27 | 0.40 | Zn | 0.25 | 1500 |

TABLE 1-continued

| Sample No. | x{(1 − a)BaO · aSrO} · y{(1 − b)MgO · bRO} · zWO₃ | | | | | | Sintering temperature (° C.) |
|---|---|---|---|---|---|---|---|
| | x | a | y | b | R | z | |
| 22 | 0.51 | 0.30 | 0.25 | 0.05 | Co | 0.24 | 1500 |
| 23 | 0.51 | 0.30 | 0.25 | 0.10 | Co | 0.24 | 1500 |
| 24 | 0.51 | 0.30 | 0.25 | 0.20 | Co | 0.24 | 1500 |
| 25 | 0.51 | 0.30 | 0.25 | 0.20 | Co | 0.24 | 1500 |
| 26 | 0.50 | 0.10 | 0.25 | 0.10 | Co | 0.25 | 1500 |
| | | | | 0.10 | Ni | | |
| 27 | 0.50 | 0.20 | 0.25 | 0.05 | Ni | 0.25 | 1500 |
| | | | | 0.15 | Zn | | |
| 28 | 0.50 | 0.40 | 0.25 | 0.15 | Co | 0.25 | 1500 |
| | | | | 0.15 | Ni | | |

TABLE 2

| Sample No. | $I_{112}/I_{211}$ | Average crystal particle diameter (μm) | Dielectric constant (εr) | Q value at 10 GHz | Temperature coefficient of resonance frequency (ppm/° C.) |
|---|---|---|---|---|---|
| 1 | 0.03 | 3 | 20 | 16,000 | −30 |
| 2 | 0.03 | 4 | 20 | 19,100 | −31 |
| 3 | 0.04 | 4 | 19 | 23,400 | −28 |
| 4 | 0.03 | 4 | 19 | 19,600 | −18 |
| 5 | 0.04 | 3 | 19 | 13,600 | −17 |
| 6 | 0.03 | 3 | 18 | 12,300 | −20 |
| 7 | 0.04 | 4 | 18 | 20,600 | −1 |
| 8 | 0.04 | 4 | 17 | 18,000 | −2 |
| 9 | 0.04 | 3 | 19 | 11,700 | −1 |
| 10 | 0.03 | 4 | 20 | 17,300 | +27 |
| 11 | 0.03 | 3 | 18 | 15,400 | +25 |
| 12 | 0.03 | 4 | 17 | 14,700 | +25 |
| 13 | 0.03 | 3 | 19 | 17,500 | −29 |
| 14 | 0.03 | 3 | 19 | 18,000 | −29 |
| 15 | 0.03 | 3 | 19 | 19,100 | −30 |
| 16 | 0.08 | 3 | 17 | 12,800 | +2 |
| 17 | 0.07 | 3 | 16 | 12,200 | +11 |
| 18 | 0.08 | 3 | 17 | 11,100 | +25 |
| 19 | 0.04 | 4 | 18 | 13,700 | −9 |
| 20 | 0.05 | 4 | 19 | 12,800 | +2 |
| 21 | 0.04 | 3 | 18 | 12,300 | 0 |
| 22 | 0.02 | 4 | 17 | 13,800 | +14 |
| 23 | 0.01 | 3 | 18 | 14,400 | +12 |
| 24 | 0.02 | 3 | 17 | 13,300 | +11 |
| 25 | 0.02 | 3 | 17 | 12,500 | +12 |
| 26 | 0.03 | 4 | 19 | 17,800 | −21 |
| 27 | 0.04 | 4 | 19 | 19,800 | −1 |
| 28 | 0.04 | 3 | 18 | 11,300 | +25 |

From these tables, the high frequency dielectric ceramics of this invention satisfy $I_{112}/I_{211}<0.10$ and average crystal particle diameters of 2 to 20 μm, and it is seen that a Q value at 10 GHz is as high as at least 11100. Furthermore, it is understood that as the amount (a) of substitution by SrO becomes greater, τf is shifted from −30 ppm/° C. to a plus side. FIG. 1 shows the results of X-ray diffraction measurement of sample No. 3.

The present inventors further prepared dielectric ceramics in the same way as above by using the compositions of sample No. 3 and sample No. 10 of Table 1 except that the sintering temperature and the sintering time were as shown in Table 3. The characteristics of the samples were measured in the same way as above.

TABLE 3

| Sample No. | Composition | Sintering conditions | $I_{112}/I_{211}$ | Average crystal particle diameter (μm) | Dielectric constant | Q value (10 GHz) |
|---|---|---|---|---|---|---|
| 29 | No. 3 | 1450° C. × 2 h | 0.03 | 1 | 20 | 12500 |
| 30 | No. 3 | 1500° C. × 2 h | 0.03 | 3 | 19 | 23400 |
| 31 | No. 3 | 1550° C. × 2 h | 0.06 | 5 | 19 | 20600 |
| *32 | No. 3 | 1600° C. × 2 h | 0.10 | 10 | 18 | 9800 |
| 33 | No. 10 | 1450° C. × 2 h | 0.03 | 1 | 19 | 13500 |
| 34 | No. 10 | 1500° C. × 2 h | 0.03 | 3 | 19 | 17300 |
| 35 | No. 10 | 1550° C. × 2 h | 0.05 | 6 | 20 | 21100 |
| 36 | No. 10 | 1600° C. × 2 h | 0.06 | 10 | 19 | 20000 |
| 37 | No. 10 | 1600° C. × 24 h | 0.08 | 20 | 18 | 18400 |
| *38 | No. 10 | 1600° C. × 36 h | 0.12 | 25 | 18 | 7700 |

*marks show samples outside the scope of this invention.

It is seen from Table 3 that samples Nos. 32 and 38 in which the $I_{112}/I_{211}$ were at least 0.10 had a Q value of as low as less than 9800. When the average crystal particle diameter was within the range of 3 to 20 μm, the Q values of the samples became higher than those samples outside the range.

What is claimed is:

1. A dielectric ceramic comprising a perovskite crystal phase being precipitated as a main crystal phase and a complex oxide crystal phase other than the perovskite crystal phase being precipitated as a sub-crystal phase, wherein the perovskite crystal phase contains Mg, W, at least one element selected from the group consisting of iron family metal elements and Zn, Ba and Sr as metal elements, the complex oxide crystal phase contains W and at least one element selected from the group consisting of Ba and Sr as metal elements, and the main crystal phase and the sub-crystal phase have a peak intensity ratio by X-ray diffraction of the formula (1):

$$I_{112}/I_{211}<0.10 \qquad (1)$$

wherein $I_{112}$ represents the peak intensity ratio of the (112) plane in a tetragonal system of the sub-crystal phase, and I211 represents the peak intensity ratio of the (211) plane in a rhombohedral system of the main crystal phase.

2. A dielectric ceramic according to claim 1 wherein the metal elements constituting the perovskite crystal phase and the complex oxide crystal phase are such that when the mole ratio of the metal elements is shown in the following formula (2):

$$x\{(1-a) \text{ BaO} \cdot a\text{SrO}\} y\{(1-b)\text{MgO} \cdot b\text{RO}\} \cdot z\text{WO}_3 \qquad (2)$$

wherein R represents at least one element selected from the aroup consisting of iron family metal elements and Zn, x, y and z are numbers satisfying x+y+z=1, a, b, x, y and z satisfy the following conditions $0<a \leq 0.4$ $0.01 \leq b \leq 0.4$ $0.48 \leq x \leq 0.51$ $0.23 \leq y \leq 0.27$ $0.24 \leq z \leq 0.26$.

3. A dielectric ceramic according to claim 2 wherein a, b, x, y and z in the formula (2) satisfy the following conditions:

$0<a \leq 0.4$ $0.01 \leq b \leq 0.3$ $0.49 \leq x \leq 0.50$ $0.24 \leq y \leq 0.26$ $0.25 \leq z \leq 0.26$.

4. A dielectric ceramic according to claim 1 wherein crystal particles constituting the main crystal phase and the sub-crystal phase have an average particle diameter of 3 to 20 μm.

5. The dielectric ceramic of claim 1, wherein the main crystal phase and the sub-crystal phase have a peak intensity ratio by X-ray diffraction of the formula (3):

$$0.01 < I_{112}/I_{211} < 0.05 \qquad (3).$$

* * * * *